W. M. VON SICK.
PRESSURE INDICATOR AND REGULATOR.
APPLICATION FILED JUNE 15, 1916.
1,225,084.
Patented May 8, 1917.
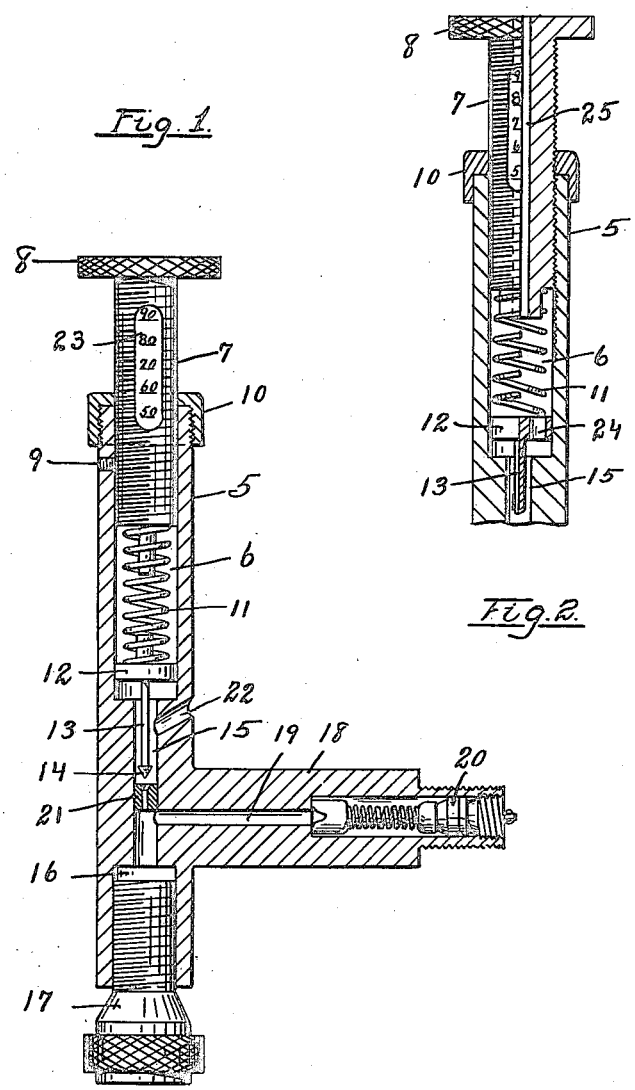
INVENTOR
WM M. VON SICK.
by Andrew D. Martell
ATTORNEY

UNITED STATES PATENT OFFICE.

WILLIAM M. VON SICK, OF LOS ANGELES, CALIFORNIA, ASSIGNOR OF ONE-HALF TO DANIEL M. CRITCHLEY.

PRESSURE INDICATOR AND REGULATOR.

1,225,084.  Specification of Letters Patent.  Patented May 8, 1917.

Application filed June 15, 1916. Serial No. 103,702.

*To all whom it may concern:*

Be it known that I, WILLIAM M. VON SICK, a citizen of the United States, residing at the city of Los Angeles, county of Los Angeles, and State of California, have invented new and useful Improvements in Pressure Indicators and Regulators, of which the following is a specification.

My invention relates to pressure indicators and regulators and the object thereof is to provide a device of this character which in some of its embodiments is especially fitted for pneumatic tires, such as those used for automobiles, but which is applicable to any fluid receiving apparatus, by which the desired pressure within the tire or other apparatus may be indicated and by which any excess pressure may be automatically relieved.

A further object is to provide a device of this character which can be set at the pressure desired and which will automatically prevent any excess pressure being admitted within the tire or other receptacle.

I accomplish these and other objects as will appear hereinafter by the device described herein and illustrated in the accompanying drawings forming a part hereof in which:

Figure 1 is a vertical central section of my device with parts in elevation.

Fig. 2 is a fragmentary view of a modified form of the pressure regulating portion of my device.

While I have shown the preferred form of my device it will be understood that various changes in the form and construction thereof may be made without departing from the spirit of my invention.

In the drawings I have shown my device in a form adapted for pneumatic tires but I do not restrict myself to its use with pneumatic tires or any particular fluid pressure apparatus but may adapt the same to any desired suitable use.

Referring to the drawings 5, represents an outer casing substantially T shaped in vertical longitudinal section in the upper end of the longer leg of which is formed a spring chamber 6. The upper end of chamber 6, is threaded internally and a gage bar 7, is in screw threaded engagement therewith. Bar 7, extends upwardly from casing 5, and terminates in a knurled head 8, for adjustment. A set screw 9, is provided in the upper end of casing 5, and its inner end bears against bar 7, to retain the same in its adjusted position. A cap nut 10 is provided to give the device a more finished appearance, and is screwed upon the top of casing 5, and surrounds bar 7.

Mounted within spring chamber 6, is a pressure regulating coil spring 11, the upper end of which bears against the lower end of bar 7, and the lower end rests upon the top of a pressure regulating piston 12, mounted to slide vertically in said chamber. Projecting downwardly from the underside of piston 12, is a valve stem 13, the lower end of which terminates in a valve 14. Extending downwardly from the lower end of chamber 6, is a valve chamber 15, into which valve 14, and stem 13 project, which valve chamber terminates in an outlet chamber 16. Outlet chamber 16 is provided with a coupling or connecting member 17, of any desired construction. Extending longitudinally and centrally through short member 18, of casing 5, is an inlet port 19, the outer end of which is enlarged and has mounted therein in the usual manner a Shrader valve 20. The inner end of port 19, connects with valve chamber 15. Mounted in valve chamber 15, immediately above port 19, is a valve seat 21, upon which valve 14, is adapted to seat normally. Extending through casing 5, and connecting valve chamber 15, at a point above valve seat 21, and below piston 12, to atmosphere is an escape port 22, through which the excess pressure escapes. Gage bar 7, is flattened on opposite sides near the upper end and has thereon a gage 23, which indicates the desired pressure. The free end of member 17 is threaded for the reception of the usual hose coupling.

In Fig. 2, the construction will be the same as in my preferred form shown in Fig. 1, except that cap nut 10, will be in threaded engagement with bar 7, and will act as a lock nut in lieu of set screw 9, of the preferred form, and escape port 22, will be omitted. Instead of escape port 22, in this form I perforate piston 12, by perforations 24, and provide an escape port 25, longitudinally through bar 7.

In operation with an auto tire my device will first be screwed upon the nipple of the tire by member 17. The gage bar will be rotated to move up or down until the desired gage mark indicating the pressure desired, registers with the upper edge of nut 10. Pressure will then be admitted through the Shrader valve in the usual manner and when the desired pressure is reached any additional pressure will cause valve 14 to leave its seat and allow the excess pressure to escape through port 22.

Having described my invention what I claim is:—

1. A pressure indicator and regulator comprising a casing substantially T shaped in vertical longitudinal section; a spring chamber in the upper end of the long leg of said casing; a longitudinally adjustable pressure regulating bar mounted in the upper end of said spring chamber in screw threaded engagement with said casing and projecting upwardly therefrom and terminating in a head; said bar having a portion of its opposite sides flattened, said flattened portions having indicia thereon for indicating the desired pressure; means projecting through said casing adapted to bear against said bar to prevent rotation thereof; an outlet chamber in the lower end of said long leg; a coupling member mounted at one end in said outlet chamber and projecting downwardly therefrom; a valve chamber connecting the inner ends of said spring and outlet chambers; an inlet passage extending longitudinally through the short leg of said casing and opening into said valve chamber, at its inner end the other end opening to atmosphere; an inwardly opening check valve in the outer end of said inlet passage; a valve seat in said valve chamber above said inlet opening; a piston slidably mounted in the lower end of said spring chamber; a stem projecting downwardly from said piston into the valve chamber; a valve on the lower end of said stem adapted to seat on said valve seat to close the opening therethrough; and a spring in said spring chamber between said pressure regulating bar and the piston adapted to hold said valve seated until the indicated pressure is reached.

2. A pressure indicator and regulator comprising a casing substantially T shaped in vertical longitudinal section; a spring chamber in the upper end of the long leg of said casing; a longitudinally adjustable pressure regulating bar mounted in the upper end of said spring chamber in screw threaded engagement with said casing and projecting upwardly therefrom and terminating in a head; said bar having a portion of its opposite sides flattened, said flattened portions having indicia thereon for indicating the desired pressure; means projecting through said casing adapted to bear against said bar to prevent rotation thereof; an outlet chamber in the lower end of said long leg; a coupling member mounted at one end in said outlet chamber and projecting downwardly therefrom; a valve chamber connecting the inner ends of said spring and outlet chambers; an inlet valve chamber in the outer end of the other leg of said casing; an inwardly opening check valve in said last valve chamber; an inlet passage connecting said inlet valve chamber and said first mentioned valve chamber; a valve seat in said valve chamber above said inlet opening; a piston slidably mounted in the lower end of said spring chamber; a stem projecting downwardly from said piston into the valve chamber; a valve on the lower end of said stem adapted to seat on said valve seat to close the opening therethrough; and a spring in said spring chamber between said pressure regulating bar and the piston adapted to hold said valve seated until the indicated pressure is reached.

WILLIAM M. VON SICK.

Witnesses:
 EMIL MONHOF,
 E. EVERETT BEAUSEJOUR.